United States Patent
Chou et al.

(10) Patent No.: US 11,265,087 B2
(45) Date of Patent: Mar. 1, 2022

(54) COMPACT OPTIC-CONNECTING DEVICE

(71) Applicant: OptoMedia Technology Inc., Hsinchu County (TW)

(72) Inventors: Hui-Tsuo Chou, Hsinchu County (TW); Pei-Hsiang Hsu, Hsinchu County (TW)

(73) Assignee: OPTOMEDIA TECHNOLOGY INC., Hsinchu County (TW)

( * ) Notice: Subject to any disclaimer, the term of this patent is extended or adjusted under 35 U.S.C. 154(b) by 0 days.

(21) Appl. No.: 17/197,428

(22) Filed: Mar. 10, 2021

(65) Prior Publication Data
US 2021/0288724 A1 Sep. 16, 2021

Related U.S. Application Data

(60) Provisional application No. 62/987,654, filed on Mar. 10, 2020.

(51) Int. Cl.
| | |
|---|---|
| *H04B 10/80* | (2013.01) |
| *H04B 10/40* | (2013.01) |
| *H04B 10/50* | (2013.01) |
| *H04B 10/60* | (2013.01) |

(52) U.S. Cl.
CPC ........... *H04B 10/801* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 10,050,656 | B1* | 8/2018 | Chen | H01R 12/62 |
| 2004/0086240 | A1* | 5/2004 | Togami | G02B 6/4246 |
| | | | | 385/92 |
| 2005/0045374 | A1* | 3/2005 | Kumar | H05K 1/118 |
| | | | | 174/254 |
| 2006/0140640 | A1* | 6/2006 | Rosenberg | H05K 1/147 |
| | | | | 398/164 |
| 2006/0257081 | A1* | 11/2006 | Ishigami | G02B 6/4283 |
| | | | | 385/92 |
| 2007/0053639 | A1* | 3/2007 | Aruga | G02B 6/4201 |
| | | | | 385/94 |
| 2012/0266434 | A1* | 10/2012 | Yu | G02B 6/4281 |
| | | | | 29/428 |

(Continued)

*Primary Examiner* — Darren E Wolf
(74) *Attorney, Agent, or Firm* — Chun-Ming Shih; HDLS IPR Services

(57) ABSTRACT

The present disclosure provides a compact-optic-connecting device for mounting on a motherboard of a computer, which includes an optic-receiving unit, an optic-launching unit, two flexible-circuit plates, a circuit board and a connecting interface. The optic-receiving unit and the optic-launching unit are connected to the bottom surface of the circuit board respectively via flexible-circuit plates. The connecting interface is connected to the bottom surface of the circuit board, and also connected to an external motherboard via the connecting interface. By virtue of such structure, the compact optic-connecting device can have a small length and size, and meanwhile to maintain a safety distance between the connecting interface and the optic-receiving unit, or the connecting interface and optic-launching unit, to prevent faulty conduction therebetween.

6 Claims, 3 Drawing Sheets

(56) References Cited

U.S. PATENT DOCUMENTS

2016/0095211 A1* 3/2016 Goto .................... H05K 1/0251
398/135
2021/0059050 A1* 2/2021 Noguchi .............. H05K 1/0253

* cited by examiner

COMPACT OPTIC-CONNECTING DEVICE

CROSS-REFERENCE TO RELATED APPLICATIONS

This application claims the benefit of priority to U.S. Provisional Application No. 62/987,654, filed Mar. 10, 2020, which is herein incorporated by reference in its entirety.

TECHNICAL FIELD

The present disclosure relates to a compact optic-connecting device, which can have a relatively small size and meanwhile to maintain a safety distance between a connecting interface and an optic-receiving unit, or between the connecting interface and an optic-launching unit within the mini-optic-connecting device itself.

BACKGROUND

Optical communication is a communicating technology using light to carry information, which is also known as optical telecommunication, wherein fiber-optic communication is nowadays the most commonly used technology. The fiber-optic communication is mainly performed by transferring information within optical fibers, which is categorized as one type of wired communication. The fiber-optic communication has several advantages, such as capable of transferring large-size data, also with fine confidentiality, hence becomes mainstream of the wired communication technologies.

In technic field of the optical communication, optic-connecting device is a significant component for receiving and transmitting optical signals, for example, gigabit interface converter (GBIC) is one type of the optic-connecting device. The optic-connecting device is mainly disposed on a console device, and includes an optical transmitter and an optical receiver. The optical transmitter is for converting electric signal into optical signal and transferring the optical signal via the optical fibers, where the optical receiver is for converting the optical signal back to electric signal and transferring to the console device.

SUMMARY

Currently on-market optic-connecting devices are large-sized, which can be a drawback for assembling into computer. Therefore, this disclosure provide a compact optic-connecting device, which has an optic-receiving unit and an optic-transmitting unit connected to a circuit board respectively via flexible-circuit plates, also has a connecting interface disposed on the circuit board. By virtue of the flexible circuit plates, the optic-connecting device can have a reduced, hence smaller length and size, and therefore facilitate to assemble the optic-connecting device into computer, at meanwhile to also maintain a safety distance between the optic-receiving unit and the connecting interface, and between the optic-transmitting unit and the connecting interface, thereby to prevent faulty conduction therebetween.

An object of the present disclosure is provide a compact optic-connecting device, wherein the optic-receiving unit and the optic-launching unit are connected to a bottom surface of the circuit board respectively via flexible circuit boards, and the connecting interface is also connected to the circuit board. Lead pins of the connecting interface are positioned substantially perpendicular to the bottom surface of the circuit, also the optic-receiving unit and the optic-transmitting unit receive and transmit optical signal in a direction substantially parallel to the bottom surface of the circuit board.

By virtue of the flexible circuit plates, the optic-connecting device according to the present disclosure can have a relatively small length and size, furthermore the optic-receiving unit and the optic-transmitting unit, the both units and the connecting interface are respectively connected to two opposite ends of the circuit board, thereby to create a safety distance between the optic-receiving unit and optic-transmitting unit, and the connecting interface, such that to prevent faulty contact therebetween.

An object of the present disclosure is to provide a compact optic-connecting device, wherein the optic-receiving unit and the optic-transmitting unit are connected to a side surface of a circuit board disposed in an upright manner, respectively via flexible circuit plates. The connecting interface is positioned on or connected to an end portion of the circuit board, wherein the end portion is formed with a surface adjacent to the side surface. The lead pins of the connecting interface are disposed substantially parallel to the side surface of the circuit board, the optic-receiving unit and the optic-transmitting unit receive and transmit optical signal in a direction substantially perpendicular to the side surface of the circuit board.

By virtue of the flexible circuit plates, the optic-connecting device according to the present disclosure can have a relatively small length and size, and allow to dispose the optic-receiving unit and the optic-transmitting unit, and connecting interface on different surfaces of the circuit board, wherein the optic-receiving unit and the optic-transmitting unit, the both units and the connecting interface are positioned on different surfaces. The optic-receiving unit and the optic-transmitting unit, and the connecting interface have the flexible-circuit plates therebetween, thereby to create a safety distance between the optic-receiving unit and optic-transmitting unit, and the connecting interface, and to prevent faulty contact therebetween.

To achieve the abovementioned, the present disclosure provide a compact optic-connecting device, which includes: a first flexible-circuit plate including a first-connecting surface and a second-connecting surface, wherein the first-connecting surface and the second-connecting surface are connected to each other, and define a first angle therebetween, the first angle has a range from 45 degrees to 135 degrees; an optic-receiving unit for receiving an optical signal, and connected to the first-connecting surface of the first flexible-circuit plate; a second flexible-circuit plate including a third-connecting surface and a fourth-connecting surface, wherein the third-connecting surface and the fourth-connecting surface are connected to each other, and define a second angle therebtween, the second angle has a range from 45 degrees to 135 degrees; an optic-transmitting unit for transmitting an optical signal, and connected to the third connecting surface of the second flexible-circuit plate; and a circuit board connected to the second-connecting surface of the first flexible-circuit plate and the fourth-connecting surface of the second flexible-circuit plate; and a connecting interface connected to the circuit board.

The present disclosure also provide another compact optic-connecting device, which includes: a first flexible-circuit plate including a first-connecting surface, a first-connecting portion and a second-connecting surface, wherein the first-connecting surface is connected to the second-connecting surface via the first-connecting portion, the first-connecting portion and the first-connecting surface define a first angle therebetween, the first-connecting portion the second-connecting surface also define a second angle therebetween, and the first and second angles have a range from 45 degrees to 135 degrees; an optic-receiving unit connected to the first-connecting surface of the first flexible-circuit plate, for receiving an optical signal; a second flexible-circuit plate including a third-connecting surface, a second-connecting portion and a fourth-connecting surface, wherein the third-connecting surface is connected to the fourth-connecting surface via the second-connecting portion, the second-connecting portion and the third-connecting surface define a third angle therebetween, the second-connecting portion and the fourth-connecting surface also define a fourth angle therebetween, the third and fourth angles has a range from 45 degrees to 135 degrees; an optic-transmitting unit connected to the third-connecting surface of the second flexible-circuit plate, for transmitting an optical signal; a circuit board connected to the second-connecting surface of the first flexible-circuit plate and the fourth-connecting surface of the second flexible-circuit plate; and a connecting interface connected to the circuit board.

The aforementioned compact optic-connecting device, wherein the first flexible-circuit plate, the second flexible-circuit plate and the connecting interface is disposed on a bottom surface of the circuit board.

The aforementioned compact optic-connecting device, wherein the optic-receiving unit and the optic-transmitting unit transfer the optical signal in a direction parallel to the bottom surface of the circuit board, and the connecting interface is perpendicular to the bottom surface of the circuit board.

The aforementioned compact optic-connecting device, further includes a bottom seat including a plurality of through holes and two connecting holes, wherein the connecting holes are disposed on a side surface of the bottom seat, the through holes are formed on a bottom surface of the bottom seat, the optic-receiving unit and the optic-transmitting unit are disposed on the bottom seat and toward the connecting holes respectively, and the connecting interface extends through the through hole of the bottom seat; and a cover shell connected to the bottom seat, wherein the circuit board and the connecting interface are positioned between the bottom seat and the cover shell.

The aforementioned compact optic-connecting device, wherein each of the first flexible-circuit plate and a second flexible-circuit plate has a cross section that is L-shaped or U-shaped.

The aforementioned compact optic-connecting device, wherein the first flexible-circuit plate and the second flexible-circuit plate are disposed on a side surface of the circuit board, and the connecting interface is positioned on an end portion of the circuit board, and the end portion is formed with a surface adjacent to the side surface.

The aforementioned compact optic-connecting device, wherein the optic-receiving unit and the optic-transmitting unit transfers optical signal in a direction perpendicular to the side surface of the circuit board, and the connecting interface is parallel to the side surface of the circuit board.

BRIEF DESCRIPTION OF THE DRAWINGS

The structure as well as preferred modes of use, further objects, and advantages of this present disclosure will be best understood by referring to the following detailed description of some illustrative embodiments in conjunction with the accompanying drawings, in which.

DETAILED DESCRIPTION OF THE PREFERRED EMBODIMENTS

Figure 1:
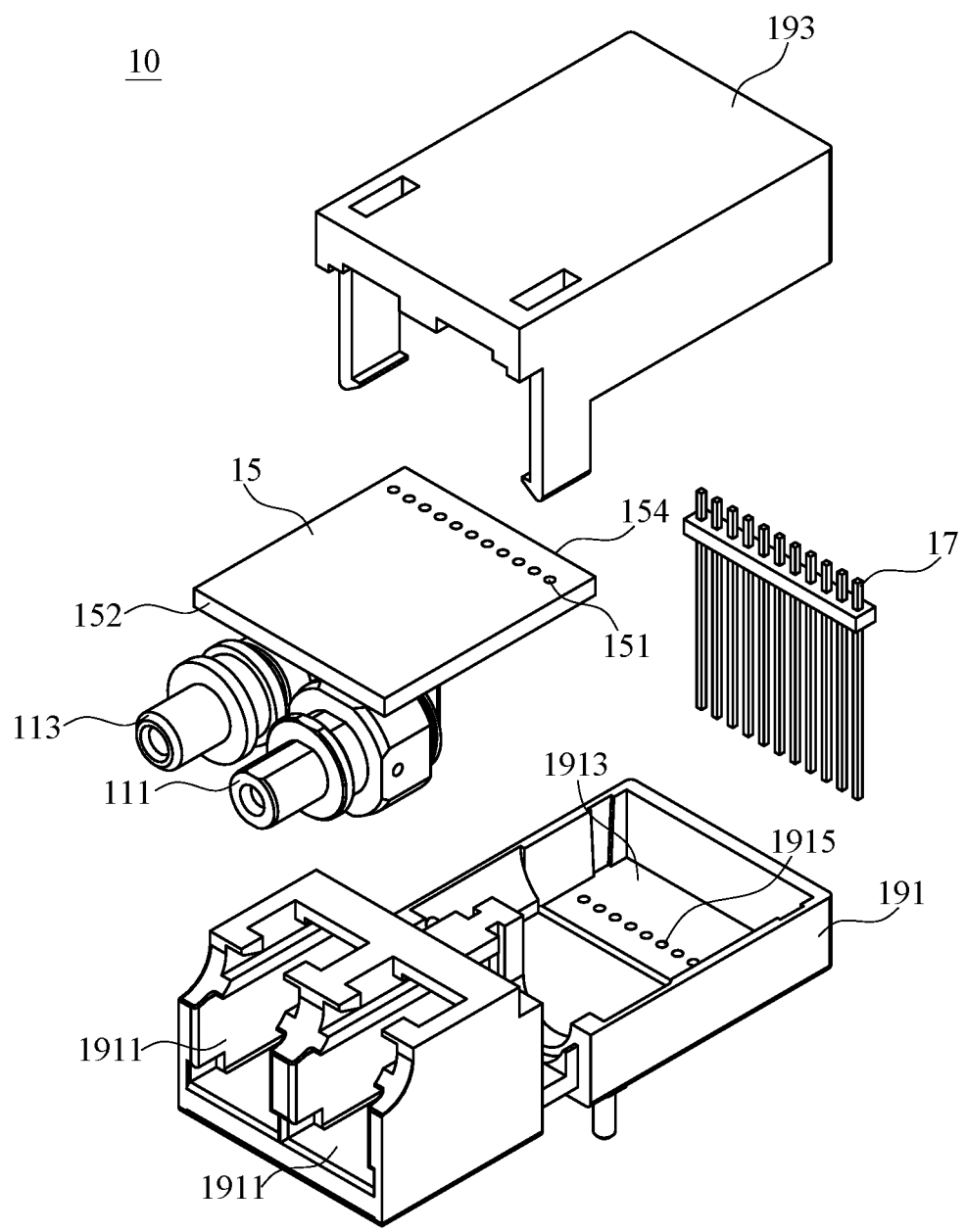
FIG. 1 is a schematic front-top perspective exploded view of a compact optic-connecting device according to one embodiment of the present disclosure.
Figure 2:
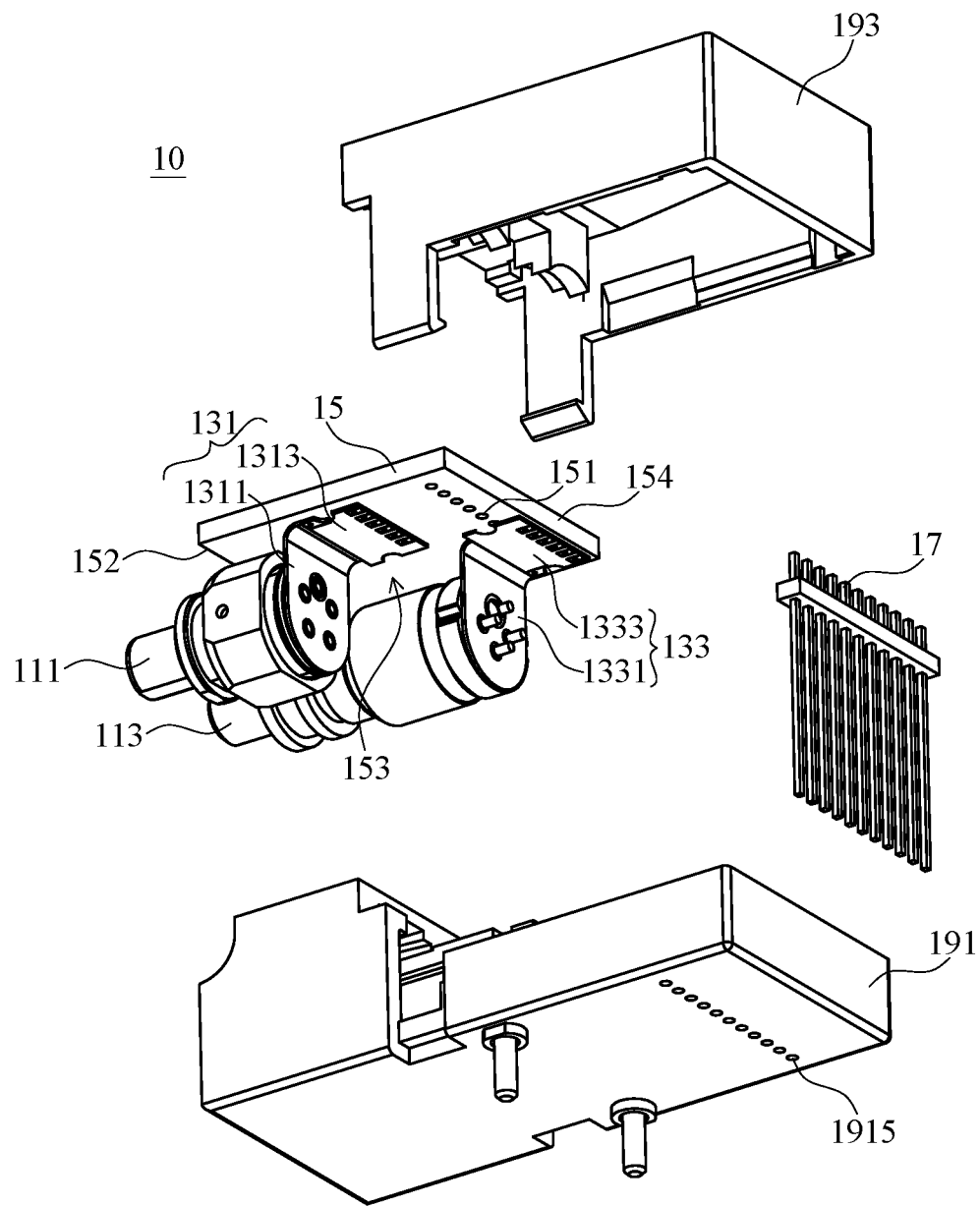
FIG. 2 is a schematic rear-bottom perspective exploded view of a compact optic-connecting device according to one embodiment of the present disclosure.

Referring to FIG. 1 and FIG. 2, which are schematic front-top perspective exploded view and rear-bottom perspective exploded view of a compact optic-connecting device 10, according to one embodiment of the present disclosure. As shown in FIGs., the compact optic-connecting device 10 mainly includes an optic-receiving unit 111, an optic-transmitting unit 113, a first flexible-circuit plate 131, a second flexible-circuit plate 133, a circuit board 15 and a connecting interface 17. The optic-receiving unit 111 is connected to the circuit board 15 via the first flexible-circuit plate 131, the optic-transmitting unit 113 connected to the circuit board 15 via the second flexible-circuit plate 133, and the connecting interface 17 is connected to the circuit board 15.

The optic-receiving unit 111 is electrically connected to the connecting interface 17 via the first flexible-circuit plate 131 and the circuit board 15, for receiving an optical signal. Specifically, the optic-receiving unit 111 may include at least one photodetector to convert the received optical signal into an electric signal via photoelectric effect. The connecting interface 17 is an electric connecting interface, wherein the converted electric signal from the optic-receiving unit 111 is transferred to the connecting interface 17.

The optic-transmitting unit 113 is electrically connected to the connecting interface 17 via the second flexible-circuit plate 133 and the circuit board 15, for generating and transmitting an optical signal. Specifically, the optic-transmitting unit 113 may include at least one light-emitting diode (LED) or at least one laser diode, to generate the optical signal in accordance with the electric signal transmitted by the connecting interface 17.

The circuit board 15 may not only be electrically connected to the optic-receiving unit 111, the optic-transmitting unit 113 and the connecting interface 17, but also further disposed with a drive circuit, an amplifier circuit, a comparer and/or a phase-locked loop (not shown), etc. thereon. The drive circuit is electrically connected to the optic-receiving unit 111 and/or the optic-transmitting unit 113, for such as driving the LED within the optic-transmitting unit 113 to transmit the optical signal. The amplifier circuit, the comparer and the phase-locked loop are electrically connected to the optic-receiving unit 111, in a manner such as to have a transimpedance amplifier (TIA) converting photo current into voltage signal, a limiting amplifier (LA) to amplify the voltage signal, then a clock and data recovery (CDR) to process the voltage signal and generate a square wave signal with a fixed clock period, for a post-staged digital circuit to process this converted square wave signal.

In one embodiment of the present disclosure, the compact optic-connecting device 10 is usually powered by a drive power source, for performing the conversion between optical signal and electric signal. Generally, the compact optic-connecting device 10 is disposed on an electronic (e.g. computer), and the electronic supplies an electricity to the compact optic-connecting device 10 via the connecting interface 17 thereof. For example, the connecting interface 17 may include a power pin, for driving the entire compact optic-connecting device 10 to receive or transmit optical signal.

In this embodiment, the first flexible-circuit plate 131 includes a first-connecting surface 1311 and a second-connecting surface 1313. The first-connecting surface 1311 and the second-connecting surface 1313 are connected to each other, and define a first angle therebetween, wherein the first angle has a range from 45 degrees to 135 degrees and preferably 90 degrees. The optic-receiving unit 111 is connected to the first-connecting surface 1311 of the first flexible-circuit plate 131, and the second-connecting surface 1313 of the first flexible circuit plate 131 is connected to the circuit board 15, such that the optic-receiving unit 111 is positioned in one side of the bottom surface 153 of the circuit board 15.

The second flexible-circuit plate 133 may include a third-connecting surface 1331 and a fourth-connecting surface 1333. The third-connecting surface 1331 and the fourth-connecting surface 1333 are connected to each other, and define a second angle therebetween, wherein the second angle has a range from 45 degrees to 135 degrees and preferably 90 degrees. The optic-transmitting unit 113 is connected to the third-connecting surface 1331 of the second flexible-circuit plate 133, and the fourth-connecting surface 1333 of the flexible circuit plate 133 is connected to the circuit board 15, such that the optic-transmitting unit 113 is also positioned in the one side of the bottom surface 153 of the circuit board 15. For example, the first-connecting surface 1311 is substantially perpendicular to the second-connecting surface 1313, and the third-connecting surface 1331 is substantially perpendicular to the fourth-connecting surface 1333, such that the first flexible-circuit plate 131 and the second flexible-circuit plate 133 have a cross section proximately L-shaped.

The connecting interface 17 is disposed on the circuit board 15, in a manner such as the optic-receiving unit 111 and the optic-transmitting unit 113 disposed on the first end 152 of the circuit board 15, and the connecting interface 17 is disposed on the second end 154 of the circuit board 15. The first end 152 and the second end 154 are two opposite ends or side edges of circuit board 15. The connecting interface 17 includes a plurality of bar-shaped lead pins. The circuit board 15 may disposed with a plurality of mounting holes 151 nearby the second end 154 thereof. The lead pins of the connecting interface 17 may plug into the mounting holes 151 of the circuit board 15, also the circuit board 15 and the connecting interface 17 may be further connected to each other by soldering, to make a complete electric connection between the circuit board 15 and the connecting interface 17.

To be specific, the optic-receiving unit 111 and the optic-transmitting unit 113 may be disposed, mounted on the bottom surface 153 of the circuit board 15, respectively via the first flexible-circuit plate 131 and the second flexible-circuit plate 133. The connecting interface 17 is also disposed, mounted on the bottom surface 153 of the circuit board 15. The optic-receiving unit 111 and the optic-transmitting unit 113 transfer optical signal in a direction substantially parallel to the bottom surface 153 of the circuit board 15, whereas the connecting interface 17 and the lead pins thereof are disposed substantially perpendicular to the bottom surface 153 of the circuit board 15. By virtue of the abovementioned connecting manner, the compact optic-connecting device 10 can have a reduced hence relatively small length and size, and meanwhile to also create a safety distance between the connecting interface 17 and the optic-receiving unit 111, and between the connecting interface 17 and the optic-transmitting unit 113, thereby to prevent any faulty conduction between the connecting interface 17, the optic-receiving unit 111 and/or the optic-transmitting unit 113.

In one embodiment, the compact optic-connecting device 10 may include a bottom seat 191 and a cover shell 193, wherein the optic-receiving unit 111 and the optic-transmitting unit 113 are disposed on the bottom seat 191. Specifically, the bottom seat 191 may have two connecting holes 1911 disposed at an end or a side surface thereof, the optic-receiving unit 111 and the optic-transmitting unit 113 are disposed respectively toward the two connecting holes 1911 of the bottom seat 191. In practical use, two optical connectors (not shown) may respectively plug into the two connecting holes 1911 of the bottom seat 191, such that to align the optical connectors with the optic-receiving unit 111 and the optic-transmitting unit 113 within the connecting holes 1911, and therefore able to receive and/or transmit optical signal by the compact optic-connecting device 10.

The connecting holes 1911 of the bottom seat 191 may be common optical connecting sockets (female connector), such as ST socket, SC socket FC socket or LC socket, etc., for plugging the corresponded optical connectors into the connecting holes 191, such as ST plug to ST socket, SC plug to SC socket, FC plug to FC socket or LC plug to LC socket.

Moreover, the bottom surface 1913 may be disposed with at least one through hole 1915 nearby the another end of the bottom seat 191, and the connecting interface 17 may extend and pass through the through hole 1915 on the bottom seat 191. The optic-receiving unit 111, the optic-transmitting unit 113, the first flexible-circuit plate 131, the second flexible-circuit plate 133 and/or the connecting interface 17 are positioned between the circuit board 15 and the bottom seat 191.

The cover shell 193 is for connecting the bottom seat 191, such that the optic-receiving unit 111, the optic-transmitting unit 113, the first flexible-circuit plate 131, the second flexible-circuit plate 133, the circuit board 15 and/or the connecting interface 17 are positioned inside of a containing space between the bottom seat 191 and cover shell 193 and hence protected by the bottom seat 191 and the cover shell 193. Furthermore, the bottom seat 191 may be disposed on a motherboard of an electronic (e.g. computer), wherein the connecting interface 17 extending through the bottom seat 191 is for connecting the motherboard of the electronic.

Figure 3:
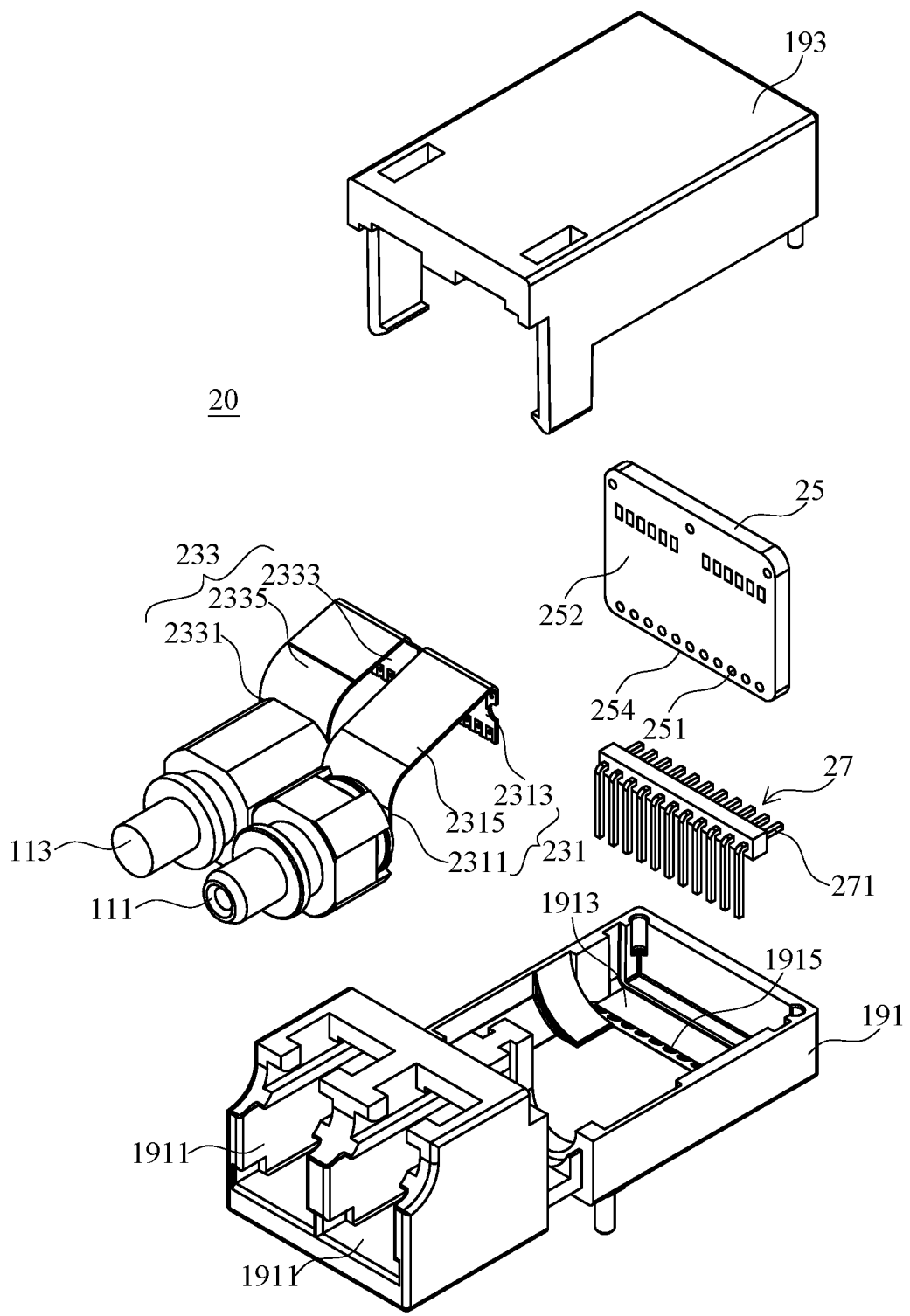
FIG. 3 is a schematic rear-top perspective exploded view of a compact optic-connecting device according to another embodiment of the present disclosure.

Referring to FIG. 3, which is a schematic rear-top perspective exploded view of a compact optic-connecting device 20, according to another embodiment of the present disclosure. As shown in the FIG, the compact optic-connecting device 20 mainly includes an optic-receiving unit 111, an optic-transmitting unit 113, a first flexible-circuit plate 231, a second flexible-circuit plate 233, a circuit board 25 and a connecting interface 27. The optic-receiving unit 111 is connected to the circuit board 25 via the first flexible-circuit plate 231, the optic-transmitting unit 113 is connected to the circuit board 25 via the second flexible-circuit plate 233, and the connecting interface 27 is connected to the circuit board 25.

In this embodiment, the first flexible-circuit plate 231 may include a first-connecting surface 2311, a first-connecting portion 2315 and a second-connecting surface 2313. The first-connecting surface 2311 is connected to the second-connecting surface 2313 via the first-connecting portion 2315. The first-connecting portion 2315 and the first-connecting surface 2311 define a first angle therebetween, the first-connecting portion 2315 and the second-connecting surface 2313 define a second angle therebetween, wherein each of the first angle and the second angle has a range from 45 degrees to 135 degrees and preferably 90 degrees. The optic-receiving unit 111 is connected to the first-connecting surface 2311 of the first flexible-circuit plate 231, and the second-connecting surface 2313 of first flexible-circuit plate 231 is connected to the circuit board 25.

The second flexible-circuit plate 233 may include a third-connecting surface 2331, a second-connecting portion 2335 and a fourth-connecting surface 2333. The third-connecting surface 2331 is connected to the fourth-connecting surface 2333 via the second-connecting portion 2335. The second-connecting portion 2335 and the third-connecting surface 2331 define a third angle therebetween, the second-connecting portion 2335 and the fourth-connecting surface 2333 define a fourth angle therebetween, wherein each of the third angle and the fourth angle has a range from 45 degrees to 135 degrees and preferably 90 degrees. The optic-transmitting unit 113 is connected to the third-connecting surface 2331 of the second flexible-circuit plate 233, and the fourth-connecting surface 2333 of the second flexible-circuit plate 233 is connected to the circuit board 25. For example, the first-connecting surface 2311 is substantially parallel to the second-connecting surface 2313, the third-connecting surface 2331 is substantially parallel to the fourth-connecting surface 2333, such that each of the first flexible-circuit plate 231 and the second flexible-circuit plate 233 has a cross section formed proximately U-shaped.

The connecting interface 27 is disposed on the circuit board 25, in a manner such as the optic-receiving unit 111 and the optic-transmitting unit 113 being connected to a side surface 252 of the circuit board 25 respectively via the first flexible-circuit plate 231 and the second flexible-circuit plate 233, and the connecting interface 27 being positioned on an end portion 254 of the circuit board 25, wherein the end portion 254 is formed with a surface adjacent to the side surface 252.

The connecting interface 27 may include a plurality of bar-shape lead pins, wherein the lead pins of the connecting interface 27 are substantially parallel to the side surface 252 of the circuit board 25. In one embodiment of the present disclosure, the connecting interface 27 may include a bending portion 271, and the end portion 254 of the circuit board 25 may be disposed with at least one mounting hole 251. The bending portion 271 of the connecting interface 27 is for plugging into the mounting hole 251 of the circuit board 25, furthermore the circuit board 25 and the connecting interface 27 are connected to each other by soldering.

To be specific, the optic-receiving unit 111 and the optic-transmitting unit 113 may be disposed, mounted on the side surface 252 of the circuit board 25, respectively via the first flexible-circuit plate 231 and the second flexible-circuit plate 233. The connecting interface 27 is positioned on the end portion 254 of the circuit board 25, wherein the end portion 254 is formed with a surface adjacent to the side surface 252. The optic-receiving unit 111 and the optic-transmitting unit 113 transfer optical signal in a direction substantially perpendicular to the side surface 252 of the circuit board 25, whereas the connecting interface 27 is disposed substantially parallel to the side surface 252 of the circuit board 25. By virtue of the abovementioned connecting manner, the compact optic-connecting device 20 can have a reduced, relatively small length and size, meanwhile to also create a safety distance between the connecting interface 27 and the optic-receiving unit 111, and between the connecting interface 27 and the optic-transmitting unit 113, such that to prevent faulty conduction between the connecting interface 27 and the optic-receiving unit 111 and/or the optic-transmitting unit 113.

The above disclosure is only the preferred embodiment of the present disclosure, and not used for limiting the scope of the present disclosure. All equivalent variations and modifications on the basis of shapes, structures, features and spirits described in claims of the present disclosure should be included in the claims of the present disclosure.

We claim:

1. A compact optic-connecting device, comprising:
   a first flexible-circuit plate comprising a first-connecting surface and a second-connecting surface, wherein the first-connecting surface and the second-connecting surface are connected to each other and define a first angle therebetween, and the first angle has a range from 45 degrees to 135 degrees;
   an optic-receiving unit connected to the first-connecting surface of the first flexible-circuit plate for receiving an optical signal;
   a second flexible-circuit plate comprising a third-connecting surface and a fourth-connecting surface, wherein the third-connecting surface and the fourth-connecting surface are connected to each other and define a second angle therebetween, and the second angle has a range from 45 degrees to 135 degrees;
   an optic-transmitting unit connected to the third-connecting surface of the second flexible-circuit plate for transmitting an optical signal;
   a circuit board connected to the second-connecting surface of the first flexible-circuit plate and the fourth-connecting surface of the second flexible-circuit plate;
   a connecting interface connected to the circuit board, wherein the first flexible-circuit plate, the second flexible-circuit plate and the connecting interface are disposed on a bottom surface of the circuit board;
   a bottom seat comprising a plurality of through holes and two connecting holes, wherein the connecting holes are disposed on a side surface of the bottom seat, the through holes are disposed on a bottom surface of the bottom seat, the optic-receiving unit and the optic-transmitting unit are disposed on the bottom seat and toward the connecting holes respectively, and the connecting interface extends through the through holes of the bottom seat; and
   a cover shell for connecting to the bottom seat, wherein the circuit board and the connecting interface are positioned between the bottom seat and the cover shell.

2. The compact optic-connecting device as claimed in claim 1, wherein: the optic-receiving unit and the optic-transmitting unit transfer the optical signal in a direction parallel to the bottom surface of the circuit board; and the connecting interface is perpendicular to the bottom surface of the circuit board.

3. The compact optic-connecting device as claimed in claim 1, wherein: each of the first flexible-circuit plate and the second flexible-circuit plate has an L-shaped cross section.

4. A compact optic-connecting device, comprising:
   a first flexible-circuit plate comprising a first-connecting surface, a first-connecting portion and a second-connecting surface, wherein the first-connecting surface is connected to the second-connecting surface via the first-connecting portion, the first-connecting portion and the first-connecting surface define a first angle therebetween, the first-connecting portion and the second-connecting surface define a second angle therebetween, each of the first angle and the second angle has a range from 45 degrees to 135 degrees;

an optic-receiving unit connected to the first-connecting surface of the first flexible-circuit plate for receiving an optical signal;

a second flexible-circuit plate comprising a third-connecting surface, a second-connecting portion and a fourth-connecting surface, wherein the third-connecting surface is connected to the fourth-connecting surface via the second-connecting portion, the second-connecting portion and the third-connecting surface define a third angle therebetween, the second-connecting portion and the fourth-connecting surface define a fourth angle therebetween, each of the third angle and the fourth angle has a range from 45 degrees and the 135 degrees;

an optic-transmitting unit connected to the third-connecting surface of the second flexible-circuit plate for transmitting an optical signal;

a circuit board connected to the second-connecting surface of the first flexible-circuit plate and the fourth-connecting surface of the second flexible-circuit plate;

a connecting interface connected to the circuit board, wherein the first flexible-circuit plate and the second flexible-circuit plate are disposed on a side surface of the circuit board; the connecting interface is positioned on an end portion of the circuit board; and the end portion is formed with a surface adjacent to the side surface;

a bottom seat comprising a plurality of through holes and two connecting holes, wherein the connecting holes are disposed on a side surface of the bottom seat, the through holes are disposed on a bottom surface of the bottom seat, the optic-receiving unit and the optic-transmitting unit are disposed on the bottom seat and toward the connecting holes respectively, and the connecting interface extends through the through holes of the bottom seat; and a cover shell for connecting to the bottom seat, wherein the circuit board, the first flexible-circuit plate, the second flexible-circuit plate and the connecting interface are positioned between the bottom seat and the cover shell.

5. The compact optic-connecting device as claimed in claim 4, wherein the optic-receiving unit and the optic-transmitting unit transfer the optical signal in a direction perpendicular to the side surface of the circuit board; and the connecting interface is parallel to the side surface of the circuit board.

6. The compact optic-connecting device as claimed in claim 4, wherein each of the first flexible-circuit plate and the second flexible-circuit plate has a U-shaped cross section.

* * * * *